(12) United States Patent
Aneziris et al.

(10) Patent No.: US 8,609,019 B2
(45) Date of Patent: Dec. 17, 2013

(54) MATERIAL COMPOSITION FOR PRODUCING A FIREPROOF MATERIAL AND THE USE THEREOF, AND FIREPROOF MOLDED BODY AND METHOD FOR THE PRODUCTION THEREOF

(75) Inventors: Christos Aneziris, Freiberg (DE); Nora Gerlach, Freiberg (DE); Holger Grote, Mülheim (DE); Claus Krusch, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 97 days.

(21) Appl. No.: 13/121,429

(22) PCT Filed: May 14, 2009

(86) PCT No.: PCT/EP2009/055828
§ 371 (c)(1),
(2), (4) Date: Mar. 29, 2011

(87) PCT Pub. No.: WO2010/034529
PCT Pub. Date: Apr. 1, 2010

(65) Prior Publication Data
US 2012/0175826 A1    Jul. 12, 2012

(30) Foreign Application Priority Data
Sep. 29, 2008   (EP) .................................. 08017129

(51) Int. Cl.
*C04B 33/32*   (2006.01)
(52) U.S. Cl.
USPC ........................................................ 264/681

(58) Field of Classification Search
USPC .......................................................... 264/681
See application file for complete search history.

(56) References Cited

U.S. PATENT DOCUMENTS

| | | | |
|---|---|---|---|
| 2,947,056 A * | 8/1960 | Csordas et al. | 264/681 |
| 4,430,440 A * | 2/1984 | Wada et al. | 501/105 |
| 4,646,950 A * | 3/1987 | Gotoh et al. | 222/591 |
| 5,039,644 A * | 8/1991 | Lachman et al. | 502/208 |

(Continued)

FOREIGN PATENT DOCUMENTS

| | | |
|---|---|---|
| CH | 469641 | 3/1969 |
| DE | 2459601 B1 | 3/1976 |

(Continued)

OTHER PUBLICATIONS

JP 09-249449 A (Fukui) Sep. 2, 1997 (English language machine translation). [online] [retrieved Aug. 6, 2013]. Retrieved from: Advanced Industrial Property Network Japan Patent Office.*

(Continued)

*Primary Examiner* — Jason L Lazorcik
*Assistant Examiner* — Erin Snelting

(57) ABSTRACT

A method for producing a refractory molded boy using a material composition having a fine-grain fraction with grain sizes of less than 100 μm and a coarse-grain fraction with grain sizes of more than 100 μm. The method includes the steps of adding a dispersing agent and/or a liquefier to the material composition unless the material compositing already includes the dispersing agent and/or liquefier, forming the material composition into a molded body, and sintering the molded body at a temperature above 1300 degrees Celsius.

4 Claims, 1 Drawing Sheet

(56) References Cited

U.S. PATENT DOCUMENTS

| | | | |
|---|---|---|---|
| 5,098,571 A * | 3/1992 | Maebashi | 210/500.23 |
| 5,102,593 A * | 4/1992 | Dotsch et al. | 264/669 |
| 5,306,673 A * | 4/1994 | Hermansson et al. | 501/1 |
| 5,854,158 A * | 12/1998 | Nawa et al. | 501/104 |
| 7,405,173 B2 * | 7/2008 | Marlin et al. | 501/105 |
| 2004/0266617 A1 * | 12/2004 | Fujii et al. | 502/340 |
| 2008/0203627 A1 * | 8/2008 | Ogunwumi et al. | 264/638 |

FOREIGN PATENT DOCUMENTS

| | | | |
|---|---|---|---|
| DE | 2624299 A1 | | 12/1976 |
| DE | 102005036394 A1 | | 2/2007 |
| EP | 0535233 B1 | | 4/1993 |
| EP | 0558540 B1 | | 6/1995 |
| EP | 1302723 A1 | | 4/2003 |
| EP | 1571393 A1 | | 9/2005 |
| EP | 1820586 A1 | | 6/2007 |
| FR | 2120566 A | | 8/1972 |
| JP | 46011683 B1 | | 3/1971 |
| JP | 58035203 A | * | 3/1983 |
| JP | 05058748 A | | 3/1993 |
| JP | 09249449 A | * | 9/1997 |
| JP | 11189459 A | | 7/1999 |
| JP | 2004352601 A | * | 12/2004 |
| JP | 2008169838 A | * | 7/2008 |
| SU | 779353 A1 | | 11/1980 |
| WO | WO 0160761 A1 | | 8/2001 |
| WO | WO 2005031046 A1 | | 4/2005 |

OTHER PUBLICATIONS

Database WPI Week 198130, Thomson Scientific, London, GB, 1981-54773D, XP002519552.

* cited by examiner

MATERIAL COMPOSITION FOR PRODUCING A FIREPROOF MATERIAL AND THE USE THEREOF, AND FIREPROOF MOLDED BODY AND METHOD FOR THE PRODUCTION THEREOF

CROSS REFERENCE TO RELATED APPLICATIONS

This application is the US National. Stage of International Application No. PCT/EP2009/055828, filed May 14, 2009 and claims the benefit thereof. The International Application claims the benefits of European Patent Office application No. 08017129.1 EP filed Sep. 29, 2008. All of the applications are incorporated by reference herein in their entirety.

FIELD OF INVENTION

The present invention relates to a material composition for producing a refractory material and a use for the material composition. It also relates to a refractory molded body for high-temperature gas reactors, in particular a heat shield element for a gas turbine, and to a method for producing the refractory molded body.

BACKGROUND OF INVENTION

The walls of hot gas carrying high-temperature gas reactors, e.g. of combustion chambers in gas turbine plants, require thermal protection of their supporting structure against hot gas attack. The thermal protection can be provided, for example, by a hot gas lining in front of the actual combustion chamber wall, e.g. in the form of a ceramic heat shield. A hot gas lining of this kind is generally made up of a number of metal or ceramic heat shield elements lining the surface of the combustion chamber wall. Because of their temperature resistance, corrosion resistance and low thermal conductivity, ceramic materials are ideally suited, compared to metal materials, for constructing a hot gas lining. A ceramic heat shield is described e.g. in EP 0 558 540 B1.

Because of the typical thermal expansion characteristics of the material and the temperature differences occurring during operation—e.g. between ambient temperature when the gas turbine plant is shut down and maximum full-load temperature—flexibility for thermal movement, particularly of ceramic heat shields, as a result of temperature-dependent expansion must be ensured, so that no heat-shield-destroying thermal stresses occur due to said temperature-dependent expansion being prevented. Expansion gaps are therefore provided between the individual heat shield elements in order to allow for thermal expansion of the heat shield elements. For safety reasons, the expansion gaps are designed such that they are never completely closed even at maximum hot gas temperature. It must therefore be ensured that the hot gas does not pass through the expansion gaps to the supporting wall structure of the combustion chamber. In order to seal the expansion gaps against the ingress of hot gas, they are frequently scavenged with seal air flowing in the direction of the combustion chamber interior. Air which is simultaneously employed as cooling air for cooling retaining elements for the heat shield elements is generally used as seal air, which results, among other things, in temperature gradients in the region of the edges of a heat shield element. As a result of the scavenging of the expansion gaps with seal air, the peripheral sides bordering the gaps as well as the cold side of the heat shield elements are cooled. On the other hand, a high heat input because of the hot gas takes place on the hot side of the heat shield elements. Inside a heat shield element, a three-dimensional temperature distribution therefore arises which is characterized by a temperature drop from the hot side to the cold side and by a temperature drop occurring from central points of the heat shield element toward the edges. Therefore, particularly in the case of ceramic heat shield elements, even without contact between adjacent heat shield elements, stresses occur on the hot side which may result in crack initiation and thus adversely affect the service life of the heat shield elements.

The heat shield elements in a gas turbine combustion chamber are typically of flat design and disposed parallel to the supporting structure. A temperature gradient running perpendicular to the surface of the supporting structure only results in comparatively low thermal stresses, as long as unhindered forward flexure in the direction of the interior of the combustion chamber is possible for the ceramic heat shield element in the installed state.

A temperature gradient running parallel to the supporting structure, such as that running from the peripheral surfaces of the heat shield element to the center of the heat shield element, quickly brings about increased thermal stresses because of the rigidity of plate-like geometries in respect of deformations parallel to their largest projection surface. These cause the cold edges of the peripheral surfaces, because of their comparatively low thermal expansion, to be placed under tension by hotter central regions which are subject to greater thermal expansion. If the material strength is exceeded, this tension can result in the initiation of cracks extending out from the edges of heat shield element toward central areas of the heat shield element.

The cracks reduce the load-bearing cross section of the heat shield element. The longer the cracks, the smaller the residual load-bearing cross section of the heat shield element. The thermally induced cracks may lengthen as the result of mechanical stress loads occurring during operation of the gas turbine plant, causing the residual cross section to be reduced still further and possibly necessitating replacement of the heat shield element. Mechanical stress loads of this kind may occur, for example, in the event of oscillatory accelerations of the combustion chamber wall which may be caused by combustion oscillations, i.e. oscillations in the combustion exhaust gases.

In order to reduce the seal air requirement - and therefore thermally induced stresses in heat shield elements, EP 1 302 723 A1 proposes providing flow barriers in the expansion gaps. This can also result in a reduction of the temperature gradient in the region of the edges. However, inserting flow barriers is not always easily possible and also increases the complexity of a heat shield.

In addition, heat shield elements are exposed to severe corrosive attack resulting in a lifetime-limiting loss of material. The material loss occurring in the case of ceramic heat shield elements is attributable to a combination of corrosion, subsequent resintering of the surface and erosive stress caused by the high mass flow of hot gas. Material loss is generally at its greatest where the highest hot gas flow rates obtain. For the ceramic heat shields frequently used nowadays made of corundum and mullite with glass phase, the material loss is essentially due to two reactions, namely first mullite decomposition and secondly grain growth and resintering. The water vapor present in the hot gas results in the decomposition of mullite ($3Al_2O_3*2SiO_2$ or $2Al_2O_3*1SiO_2$) and glass phase to corundum ($Al_2O_3$) and silicon oxide ($SiO_x$). The corundum then present at the surface of a heat shield element, both in the matrix of the heat shield element and in the corrosion layer of the mullite grains, exhibits grain growth and sintering. Grain growth and sintering increase with operating time. With increasing numbers of gas turbine startups, this results in a weakening of the surface due to microcracking. Consequently, surface particles are entrained by the high mass flow, resulting in erosion. As a result, the service life of the heat shield elements is limited by corrosion, thereby necessitating premature replacement. Add to this the fact that, in the case of heavy oil operation of a gas turbine, magnesium oxide is added as an inhibitor, which likewise results in corrosive thinning of the heat shield elements. This is caused by the corundum in the heat shield element reacting with the magnesium oxide in the inhibitor to produce spinel as a reaction product. This also results in service life reduction and the need to replace the heat shield element prematurely.

In DE 10 2005 036 394 A1 a material is described in which up to 5 wt % zirconium dioxide powder partially or completely stabilized with magnesium oxide and having a grain size of between 1 and 20 pin, and up to 5 wt % titanium dioxide powder with a grain size of between 50 nm and 20 μm are added to 90 wt % zirconium dioxide free refractory oxide powder with a grain size of between 1 and 150 μm. Up to 5 wt % refractory oxide powder with a grain size of between 1 and 20 μm can also be added to this mixture. Said additional refractory oxide powder is preferably aluminum oxide and/or magnesium oxide and/or yttrium oxide and/or cerium oxide. In the course of sintering above 1550° C. or during use of the ceramic material, the magnesium oxide stabilizer of the zirconium dioxide forms spinel phases and/or magnesium aluminate, and the zirconium dioxide is destabilized. Alternatively or in addition, zirconium titanate and/or aluminum titanate may be formed which, in aggregate, result in subcritical cracking in the ceramic matrix and improve thermal shock resistance. For the most part, only thin-walled, small-volume hollow components can be produced from said material composition, as the sintering is subject to >10 vol % shrinkage.

In CH 469 641 a method for producing a spinel-containing molded element is described. Magnesium oxide is added to an alumino-calcareous silicate glass powder. The mixture is molded and then heated and sintered, the components of the mixture being caused to react and thereby to devitrify by relatively long retention at the sintering temperature of the glass. However, the chemical, but in particular the thermomechanical properties of such a molded article above 1550° C. do not meet the requirements typically encountered nowadays in gas turbines.

DE 26 24 299 A1 describes wearing parts for molten metal containers. The wearing parts are produced using a hydraulically setting refractory concrete with a high alumina content. The refractory concrete can contain a spinel-forming additive.

DE 24 59 601 B1 describes a refractory ceramic composition which contains carbon and silicon and to which spinel-forming oxides can be added.

EP 1 571 393 A1 describes a refractory material basically consisting of magnesium oxide and a considerable amount of a magnesium-containing spinel former. However, the handling and shaping of such a material must be classified as critical because of the hydration of the magnesium oxide to magnesium hydroxide.

Described in EP 1 820 586 A1 is a ceramic nozzle brick for use in or on a metallurgical vessel for receiving molten metal. It is formed wholly or partly from ceramic fibers, hollow spheres or foamed ceramic. Also described is a ceramic nozzle brick formed wholly or partly from at least 95% pure material of the group aluminum oxide, zirconium dioxide, preferably stabilized zirconium dioxide, magnesium oxide, calcium oxide, spinel.

In EP 0 535 233 B1, a monolithic refractory material of the aluminum oxide spinel type is described.

In WO 2005/031046 A1, spinel products with added binders are described.

Described in WO 01/60761 A1 is an annular insert for sliding plates, containing carbon and at least one material from the group MgO-sinter, MgO-spinel, caustic MgO.

Alternative approaches to using ceramic heat shield elements consist in using metal heat shield elements. Although metal heat shield elements are better able to withstand temperature fluctuations and mechanical stresses than ceramic heat shield elements, in gas turbine combustion chambers, for example, they require complex cooling of the heat shield, as they possess higher thermal conductivity than ceramic heat shield elements. Moreover, metal heat shield elements are more prone to corrosion and, because of their lower temperature stability, cannot be subjected to such high temperatures as ceramic heat shield elements.

SUMMARY OF INVENTION

Vis-à-vis this prior art, the first object of the present invention is to provide an advantageous material composition for producing a thermal shock and corrosion resistant aluminum oxide based refractory material, and a use for said material. A second object of the present invention is to provide an advantageous method for producing a refractory molded body, in particular a heat shield element for high-temperature gas reactors. A third object of the present invention is to provide an advantageous refractory molded body based on a thermal shock and corrosion resistant aluminum oxide material.

The first object is achieved by a material composition as claimed in the claims and/or a use as claimed in the claims, the second object by a method as claimed in the claims for producing a refractory molded body, and the third object by a refractory molded body as claimed in the claims. The dependent claims contain advantageous embodiments of the invention.

A material composition according to the invention for producing a refractory material has a fine-grained fraction with grain sizes below 100 μm, preferably below 10 μm, in particular in the range 0.01 to 10 μm, and a coarse-grained fraction with grain sizes above 100 μm, in particular from 100 μm to 6 mm.

The fine-grained fraction of the material composition according to the invention comprises aluminum oxide ($Al_2O_3$) in a percentage by weight of at least 90% referred to the total weight of the fine-grained fraction and with a grain size of 50 nm to 100 μm, up to 5 wt % zirconium oxide ($ZrO_2$) referred to the total weight of the fine-grained fraction and with a grain size of between 50 nm and 20 μm, a stabilizer for the zirconium oxide, and up to 5 wt % titanium oxide ($TiO_2$) referred to the total weight of the fine-grained fraction and with a grain size of between 50 nm and 20 μm. In particular, the zirconium oxide of the fine-grained fraction can already be wholly or partially stabilized by the stabilizer. Alternatively, however, it is also possible for monoclinic zirconium oxide (baddeleyite) to be used as the zirconium oxide in the fine-grained fraction and for the stabilizer to be present as a discrete component of the fine-grained fraction. Suitable stabilizers for the zirconium oxide are, for example, magnesium oxide (MgO) and/or yttrium oxide ($Y_2O_3$) and/or cerium oxide (CeO) and/or calcium oxide (CaO).

The coarse-grained fraction of the material composition according to the invention constitutes a percentage by weight of more than 30%, in particular 60 to 80 wt %, referred to the total weight of the material composition and essentially comprises aluminum oxide based crushed granulate and/or aluminum oxide based hollow-sphere structures or consists of such crushed granulate and/or such hollow-sphere structures. It can in particular have the same composition as the fine-grained fraction, e.g. be produced at least partly on the basis of the fine-grained fraction as crushed granulate solidified from a melt or as pre-synthesized sintered crushed granulate, said sintered crushed granulate having been sintered at temperatures above 1300° C., preferably above 1550° C.

The coarse-grained fraction can also contain other oxides in addition to the crushed granulate and/or the hollow-sphere structures, e.g. $Al_2O_3$, $ZrO_2$, $TiO_2$.

The coarse-grained fraction present in the material composition according to the invention in particular allows large-volume solid or hollow components based on a thermal shock and corrosion resistant aluminum material to be produced. On the other hand, mainly only thin-walled small-volume hollow components can be produced from a fine-grained slip as described, for example, in DE 10 2005 036 394 A1 mentioned in the introduction, as the sintering is subject to >10% shrinkage. In addition, the difficulties described in the introduction with reference to the prior art, which are caused by the addition of cement or phosphate or aluminum hydroxide binders, do not arise in the case of the material composition according to the invention, so that a binder-free, thermal shock resistant material is inventively provided.

In particular, the material composition can also be already prepared with a dispersion medium and/or a liquefier, e.g. water.

A material composition according to the invention is used in the inventive method for producing a refractory body, in particular a heat shield element e.g. for high-temperature gas reactors such as gas turbine combustion chambers. A dispersing agent and/or a liquefier, e.g. water, is added to the material composition unless it already contains dispersing agent and/or liquefier. The material composition is then formed into a molded body and the molded body is sintered at a temperature above 1300° C. Only after sintering is the thermal shock resistant composite material of the refractory molded body produced. In the course of sintering or during use of the ceramic material, the stabilizer is removed from the zirconium oxide in the fine-grained fraction, and spinel phases and/or titanium phases of the stabilizer are produced with the matrix material. In addition, zirconium titanate and/or aluminum titanate may be formed. The destabilization of the zirconium oxide and the formation of the new phases together result in subcritical cracking in the ceramic matrix which considerably improves the thermal shock resistance of the refractory molded body produced.

If the material composition does not yet contain a dispersing agent and/or liquefier, the dispersing agent and/or liquefier is added to the material composition by first preparing a mixture of dispersing agent and/or liquefier and the fine-grained fraction and then adding the coarse-grained fraction to the mixture. In other words, a dispersion of the fine-grained fraction is first prepared which is then admixed with the coarse-grained fraction.

In particular, at least part of the coarse-grained fraction can be produced from a material composition as per the fine-grained fraction by sintering it or allowing it to solidify from a melt and then breaking it down.

For shaping, the material composition with the dispersing agent and/or liquefier is placed in a preferably porous mold, e.g. a plaster mold.

In addition to the dispersing agent and/or liquefier, at least one other inorganically or organically based auxiliary agent, e.g. calcined spinel, can be admixed with the material composition prior to molding as a sintering-promoting auxiliary phase.

For the rest, the method according to the invention enables the advantages described in relation to the material composition according to the invention to be realized in a refractory molded body.

An inventive refractory molded body which can be implemented e.g. as a refractory molded body for high-temperature gas reactors, as an immersion nozzle, as a sliding plate, as an outlet nozzle for metallurgy, etc. is produced from a material composition according to the invention and exhibits the advantages achievable on the basis of the material composition according to the invention. It can be in particular a heat shield element for gas turbine combustion chambers. Using refractory molded bodies according to the invention, a hot gas lining with a longer service life compared to the prior art can be produced.

According to the invention, the material composition can be used not only for producing refractory molded bodies but also as a refractory lining material, e.g. in a ladle or in a distributor for metallurgy.

BRIEF DESCRIPTION OF THE DRAWINGS

Further features, properties and advantages of the present invention will emerge from the following description of exemplary embodiments with reference to the accompanying drawings in which FIG. 1 schematically illustrates a refractory molded body.

DETAILED DESCRIPTION OF INVENTION

Figure 1:
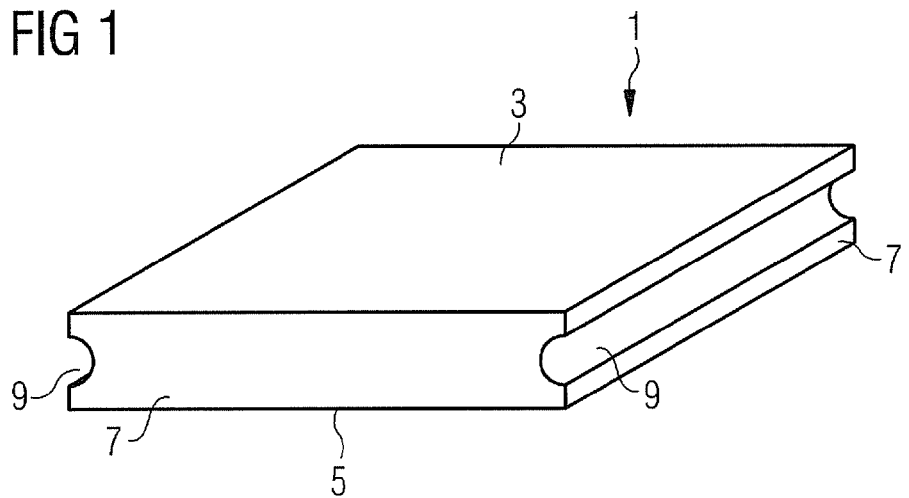

FIG. 1 schematically illustrates a heat shield element for a gas turbine combustion chamber as an example of a refractory molded body according to the invention. The heat shield element 1 shown in FIG. 1 has a hot side 3 facing the interior of the combustion chamber, a cold side 5 facing the supporting structure of the combustion chamber, and four peripheral sides 7. In two of the peripheral sides 7, grooves 9 are present which provide access to a retaining clip attaching the heat shield element 1 to the supporting structure. Self-evidently, other retention options can also be used for which the grooves 9 are unnecessary. For example, the cold side 5 of the heat shield element 1 can be bolted to the supporting structure.

A method for producing the heat shield element shown in FIG. 1 using a material composition according to the invention will now be described with reference to FIG. 2 which shows a schematic flow diagram of the method.

Figure 2:
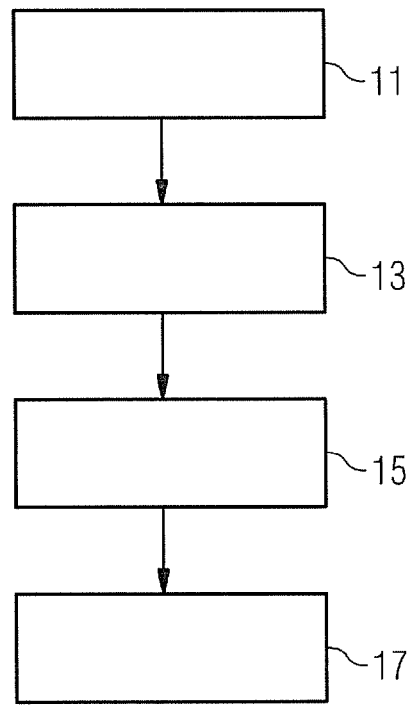
FIG. 2 shows a flow chart for the inventive method for producing a refractory molded body.

The starting point for the method shown in FIG. 2 is an inventive material composition having a coarse-grained fraction and a fine-grained fraction. In this example, the fine-grained fraction has grain sizes ranging between 0.1 and 10 μm. However, it can also basically have grain sizes up to 100 μm. The coarse-grained fraction has grain sizes ranging from 100 μm to 6 mm.

The fine-grained fraction in the present example essentially consists of three oxides, namely aluminum oxide ($Al_2O_3$), zirconium dioxide ($ZrO_2$) and titanium dioxide ($TiO_2$), the aluminum oxide constituting 95 wt % of the fine-grained fraction in this example. The two other oxides each constitute 2.5 wt % of the fine-grained fraction. In this example, the zirconium dioxide is partially stabilized in its crystal structure with magnesium oxide (MgO). Instead of on the basis of magnesium oxide, partial stabilization can additionally or alternatively be brought about on the basis of yttrium oxide ($Y_2O_3$), cerium dioxide ($CeO_2$) or calcium oxide (CaO). It should be noted that already wholly or partially stabilized zirconium dioxide need not necessarily be used. Instead, it is also possible to use monoclinic zirconium dioxide and to provide the stabilizer material as a discrete component of the fine-grained fraction. Regardless of whether the stabilizer is added as a discrete component or the zirconium dioxide is already completely or partially stabilized with the stabilizer, the percentage by weight of the stabilizer in the fine-grained fraction is between 0.01 and 0.1%.

Within the framework of the exemplary embodiment, it is possible in particular to prepare the coarse-grained fraction from the fine-grained fraction. For this purpose a composition as per the fine-grained fraction can be melted. After solidification of the melt, it is then broken down to the coarse-grained fraction. Alternatively, it is also possible to prepare the coarse-grained fraction from a mixture corresponding to the fine-grained fraction by sintering same and breaking down the resulting sintered body to the coarse-grained fraction. The coarse-grained fraction produced by means of the melting or sintering process will hereinafter be referred to as a pre-synthesized coarse-grained fraction. Since the coarse-grained fraction, once it has been prepared from the fine-grained fraction, possesses the same composition in percentages by weight as the fine-grained fraction, these percentages by weight then also correspond to the percentages by weight of the entire material composition, i.e. fine-grained fraction and coarse-grained fraction.

Instead of using a pre-synthesized coarse-grained fraction with the specified composition, it is also possible to use another aluminum oxide based coarse-grained fraction with a composition the same as or different from that of the fine-grained fraction. For example, it is possible to use as the coarse-grained fraction prefabricated aluminum oxide based hollow-sphere structures having a composition corresponding to the composition of the fine-grained fraction or a different composition. The use of a mixture of pre-synthesized coarse-grained fraction and e.g. hollow-sphere structures is also possible within the scope of the material composition according to the invention.

As a molded or unmolded product, the newly developed ceramic material can be inventively employed in metallurgy, in the automotive industry, in the glass and cement industry and in the chemical industry. For example, the ceramic material can be inventively used in metallurgy as an immersion nozzle, outlet nozzle or sliding plate, or a lining material in a ladle or in a distributor. In addition, the ceramic material can be inventively used as a porous filter body in hot gas filtration.

Three practical examples of an inventive material composition having the fine-grained fraction described above will now be described:

1. Material Composition with Pre-Sintered Coarse-Grained Fraction (crushed granulate)

In this practical example, a pre-synthesized coarse-grained fraction whose material components are of the same type and in the same percentages by weight as the fine-grained fraction are used as the coarse-grained fraction. The material composition (in percentages by weight) is as follows:
Fine-grained fraction: 20% with grain sizes between 0.8 and 3 μm;
Coarse-grained fraction: 40% with grain sizes between 0.2 and 5 mm;
13% with grain sizes between 0.5 and 1 mm;
14% with grain sizes between 1 and 2 mm;
12% with grain sizes between 2 and 3 mm;
Liquefier: 1%.

After the addition of a dispersing agent as part of a production process for a refractory molded body, the resulting slip has a water content of 4 to 8% (referred to the total weight of the original material composition).

2. Material Composition with Hollow-Sphere Corundum as the Coarse-Grained Fraction In the second example, hollow-sphere corundum, i.e. hollow-sphere structures of aluminum oxide, are used instead of a pre-synthesized coarse-grained fraction. The material composition (in percentages by weight) is as follows:
Fine-grained fraction: 39% with grain sizes between 0.8 and 3 μm;
Hollow-sphere corundum: 30% with grain sizes up to 0.5 mm; 15% with grain sizes from 0.5 to 1 mm; 15% with grain sizes von 1 to 2 mm;
Liquefier: 1%.

After the addition of a dispersing agent as part of a production process for a refractory molded body, the resulting slip has a water content of 4 to 10% (referred to the total weight of the original material composition).

3. Material Composition with Pre-Synthesized Coarse-Grained Fraction and Tabular Alumina In this example, the material composition contains tabular alumina as a further coarse-grained fraction in addition to the fine-grained fraction and pre-synthesized coarse-grained fraction. The composition (in percentages by weight) is as follows:
Fine-grained fraction: 20% with grain sizes from 0.8 to 3 μm;
Pre-synthesized coarse-grained fraction: 5% with grain sizes from 0.2 to 0.5 mm; 10% with grain sizes from 0.5 to 1 mm; 14% with grain sizes from 1 to 2 mm; 12% with grain sizes from 2 to 3 mm;
Tabular alumina: 34% with grain sizes from 0.2 to 0.6 mm; 5% with grain sizes 0.5 to 1 mm;
Liquefier: 1%.

After the addition of a dispersing agent as part of a production process for a refractory molded body, the latter has a water content of 4 to 8% referred to the original material composition of fine-grained fraction and coarse-grained fraction (including pre-synthesized coarse-grained fraction and tabular alumina).

An alternative composition for a material composition based on a fine-grained fraction, pre-synthesized coarse-grained fraction and tabular alumina is detailed below (percentages are by weight):
Fine-grained fraction: 30% with grain sizes from 8 μm to 3 mm;
Pre-synthesized coarse-grained fraction: 5% with grain sizes 0.2 mm to 0.5 mm; 10% with grain sizes from 0.5 to 1 mm; 10% with grain sizes from 1 to 2 mm; 10% with grain sizes from 2 to 3 mm;
Tabular alumina: 10% with grain sizes from 0.2 to 0.6 mm; 24% with grain sizes from 0.5 to 1 mm;
Liquefier: 1%.

After the preparation of a slip by adding a dispersing agent as part of a production process for a refractory molded body, this composition also has a water content ranging from 4 to 8% referred to the fine-grained fraction and the coarse-grained fraction (including the pre-synthesized coarse-grained fraction and the tabular alumina).

It should be noted that in the practical examples the material compositions do not need to contain a liquefier. This can then be added as part of a production process for refractory molded bodies. However, if a material composition already contains liquefier, this has a percentage by weight ranging from 0.1 to 1% referred to the total weight of the material composition.

Using a method according to the invention, the material composition according to the invention can be processed into a refractory molded body as follows:

At the start of the method shown in FIG. 2, the fine-grained fraction is prepared by adding thereto a dispersing agent, e.g. water (step 11). The coarse-grained fraction is then added to the prepared fine-grained fraction (step 13). Also in this step the liquefier can be added unless the material composition already contains some. It is also possible for further organically/inorganically based auxiliary agents to be added. The result is a slip or a plastic mass or a granulate which can be supplied to a shaping process.

Possible shaping processes (step 15) are, in particular, casting processes, extrusion processes or press forming processes enabling a molded body to be produced. Slip casting with or without the application of pressure or vacuum in porous molds, e.g. plaster-based, is used as a suitable binder-free shaping method both for efficient mixing of the fine- and coarse-grained fraction and for the production of complex thin- or thick-walled geometries.

The molded body is then sintered at temperatures above 1550° C. (step 17). In the course of sintering or during use of the ceramic material, the stabilizer of the zirconium dioxide (i.e. magnesium oxide in this example) is removed from the grain of the fine-grained fraction, thereby producing spinel phases and/or magnesium titanate with the matrix material. In addition, zirconium titanate phases and/or aluminum titanate phases may be formed. The destabilization of the zirconium dioxide and the formation of the new phases altogether result in subcritical cracking of the ceramic matrix, which considerably improves thermal shock resistance.

The method described can be used in particular to produce heat shield elements of the kind described with reference to FIG. 1.

The invention provides a corrosion resistant aluminum oxide material which both mitigates the difficulties associated with fine-grain powders in respect of the production of large-volume, solid or hollow components, as mentioned in the introduction, and avoids the chemical disadvantages resulting from the addition of cement or phosphate or aluminum hydroxide binders.

The invention claimed is:
1. A method for producing a refractory molded body using a material composition having a fine-grained fraction with grain sizes below 100 μm and a coarse-grained fraction with grain sizes above 100 μm, the method comprising:
   adding a dispersing agent and/or a liquefier to the material composition unless the material composition already comprises the dispersing agent and/or liquefier;
   forming the material composition into a molded body; and
   sintering the molded body at a temperature above 1300 degrees Celsius,
   wherein the fine-grained fraction comprises:
      aluminum oxide in a percentage by weight of at least 90% of a total weight of the fine-grained fraction and including a grain size of 50 nm to 100 μm,
      zirconium oxide in a percentage by weight of greater than 0% and up to 5% of the total weight of the fine-grained fraction and with the grain size of between 50 nm and 20 μm,
      a stabilizer for the zirconium oxide, and
      titanium oxide powder in a percentage by weight of greater than 0% and up to 5% of the total weight of the fine-grained fraction and with the grain size of between 50 nm and 20 μm,
   wherein the coarse-grained fraction constitutes a percentage by weight of more than 30% of the material composition and comprises aluminum oxide based crushed granulate and/or aluminum oxide based hollow-sphere structures, and
   wherein at least part of the coarse-grained fraction has previously been prepared from the fine-grained fraction by sintering the fine-grained fraction or allowing the fine-grained fraction to solidify from a melt and then breaking the solidified fine-grained fraction down.

2. The method as claimed in claim 1, wherein the adding further comprises, first preparing a mixture of dispersing agent and/or liquefier and the fine-grained fraction and then adding the coarse-grained fraction to the mixture.

3. The method as claimed in claim 1, wherein the material composition including the dispersing agent is placed in a porous mold for forming the molded body.

4. The method as claimed in claim 1, wherein, in addition to the dispersing agent, another inorganically or organically based auxiliary agent is added to the material composition prior to the forming.

* * * * *